UNITED STATES PATENT OFFICE.

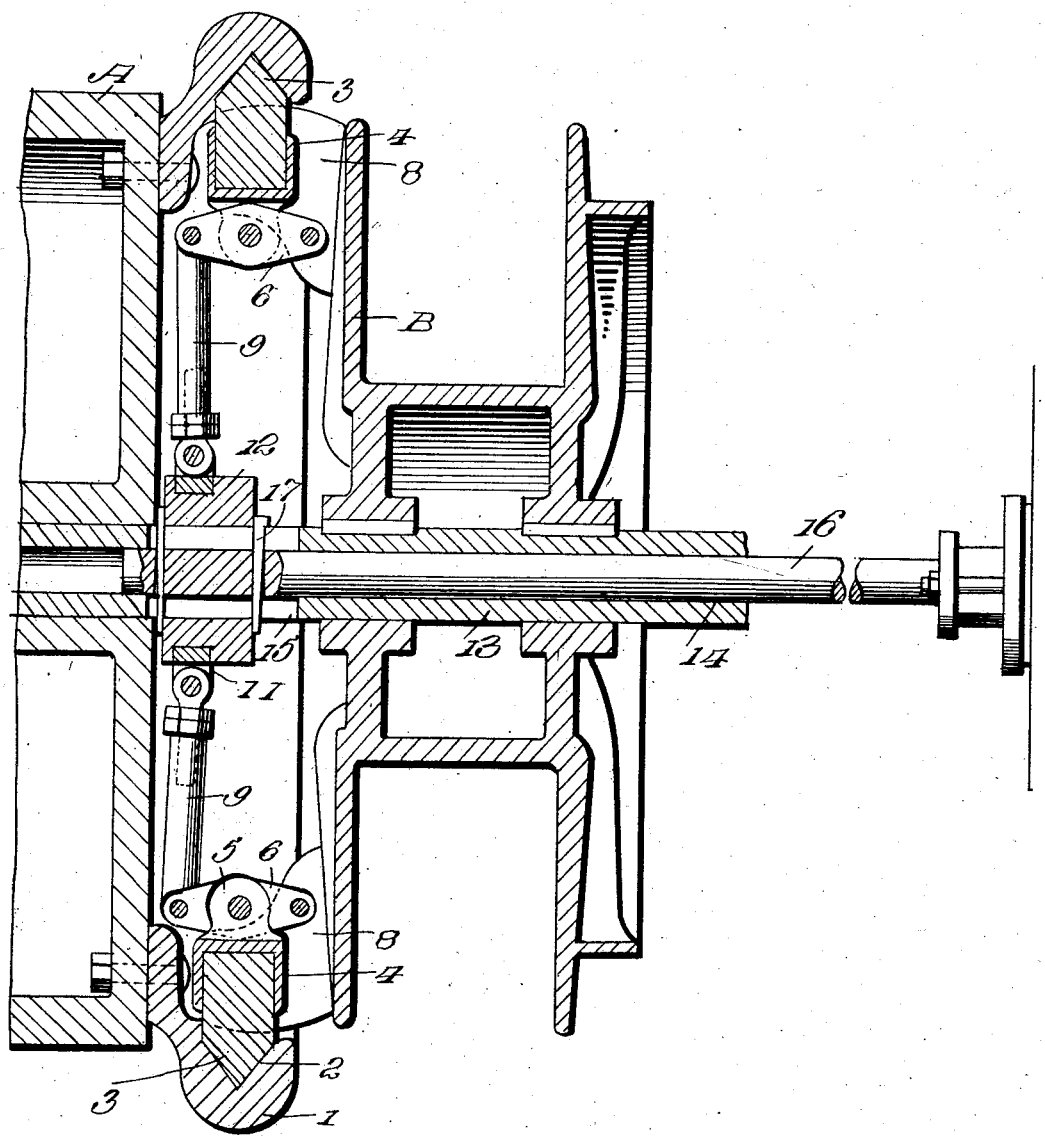

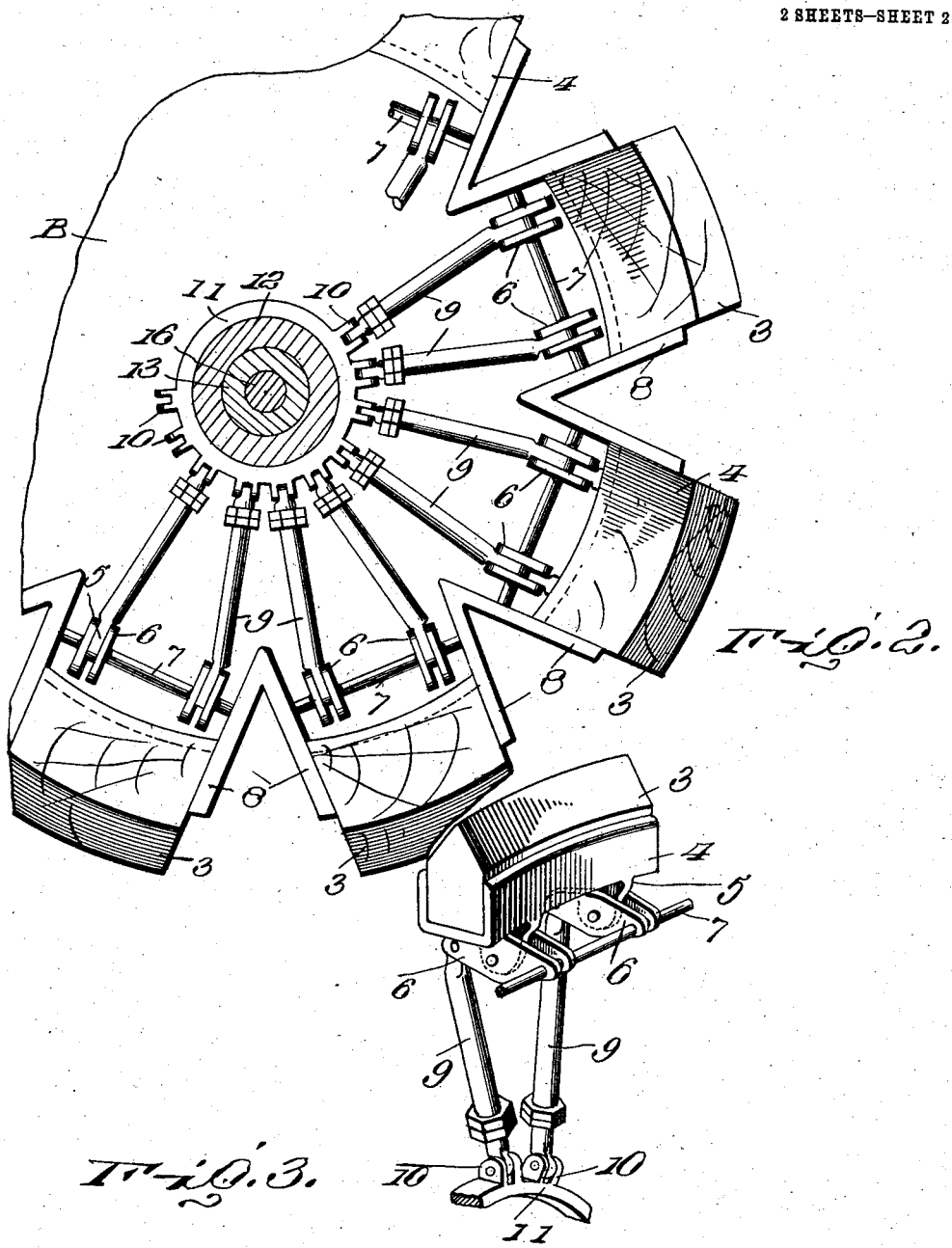

MARK D. MEEK, OF EAU CLAIRE, WISCONSIN.

CLUTCH.

1,010,935.  Specification of Letters Patent.  Patented Dec. 5, 1911.

Application filed September 22, 1910. Serial No. 583,255.

*To all whom it may concern:*

Be it known that I, MARK D. MEEK, a citizen of the United States, residing at Eau Claire, in the county of Eau Claire and State of Wisconsin, have invented certain new and useful Improvements in Clutches, of which the following is a specification.

This invention comprehends certain new and useful improvements in clutches, and relates particularly to an improved clutch designed to couple a cable drum to a drive element in a logging, yarding, and hoisting engine, although it is to be understood that the invention is equally applicable for other uses.

The invention has for its primary object a simple, durable construction of clutch which will operate efficiently to couple together drive and driven parts, and the invention consists in certain constructions, and arrangements of the parts that I shall hereinafter fully describe and claim.

For a full understanding of the invention, reference is to be had to the following description and accompanying drawings in which:

Figure 1 is a longitudinal sectional view of a clutch constructed in accordance with my invention; Fig. 2 is a fragmentary face view of one of the main parts to be coupled by the use of the clutch; and, Fig. 3 is a detail perspective view of one of the clutch blocks and the parts which support it.

Corresponding and like parts are referred to in the following description and accompanying drawings by the same reference characters.

Referring to the drawings, A designates a rotary driving element, and B a driven element the latter in the present instance being illustrated as a drum for a cable, although it is to be understood that these parts, namely, A and B are selected for the purpose of illustration only, and that they are to be considered as interchangeable. That is to say, while the element A is the drive element in the present instance, and the element B the driven element, the part B may; so far as the principles of the invention are concerned, be considered as the drive element. However, for the sake of clearness, I shall hereinafter uniformly refer to the part A as the drive element, and the drum B as the driven element.

Detachably secured by bolts or similar fastening devices to the drive element A, is an interiorly grooved ring 1, the groove 2 of the ring being V-shaped in cross section in the present instance. The groove 2 is designed to accommodate any desired number of friction blocks 3 which are preferably formed of wood, the outer edges of the blocks being oppositely beveled to fit snugly in the groove, as best illustrated in Fig. 1 and the blocks being held in any desired way within U-shaped shoes 4. Each shoe 4 is formed with a pair of apertured lugs 5. Links 6 arranged in pairs as shown, are pivotally connected intermediate of their ends to the lugs 5, the links extending transversely and being pivotally mounted at one end on a shaft or rod 7. The rods 7 are secured between V-shaped brackets 8 that project laterally from one face of the driven element or drum B, the opposing walls of the respective brackets being substantially parallel as best illustrated in Fig. 2, and being engaged by the end edges of the shoes 4, to assist in guiding the parts in their movement.

At opposite ends, the links are pivotally connected to the outer ends of substantially radial arms 9, and said arms are pivotally connected at their inner ends to the apertured ears 10 formed in a band 11 which is mounted within a groove formed in a collar 12. Preferably, the arms 9 are extensible, so that they may be adjusted whenever necessary to secure a proper proportioning of the parts.

The collar 12 is mounted for a limited movement on the drive shaft 13, the drive element A being fast on said shaft, and the driven element or drum B being mounted loose on the shaft. The shaft 13 is formed at one end with a longitudinally extending bore 14 intersected by a longitudinal slot 15, and an actuating rod 16 is mounted for a longitudinal movement in the bore 14 and is secured to the collar 12 by pins or keys 17 extending through the rod and working in the slots 15. Hence it will be understood that the longitudinal movement of the rod 16 will effect a corresponding movement of the collar 12. A movement of the collar 12 in one direction will, as is manifest, draw the arms 9 in a direction to rock the links 6 inwardly, this movement resulting in a drawing in of the friction blocks 3, and their disengagement from the ring 1, the drum B being thereby uncoupled or disengaged from the drive element. A movement of the rod in the opposite direction will rock the links 6 outwardly on their supporting rods or shafts 7 and force the friction blocks 3 into the groove 2 of the ring 1, thereby coupling the drive and driven elements together and causing the drum B to rotate as the drive element A rotates.

It is obvious that the parts may be easily assembled and disassembled, and that they are comparatively few in number, and of simple construction, and not liable to get out of order.

Having thus described the invention, what is claimed as new is:

1. A clutch comprising a driving element, an interiorly grooved ring carried at one end of the element, a hollow shaft supporting the element, a driven element keyed to the shaft, a plurality of outwardly flaring V-brackets arranged circularly against the inner side of the driven element and projecting into the ring, pairs of links hinged between the V-brackets, shoes hinged upon the links midway of their ends, friction blocks carried in the shoes and seating in the groove of the ring, a collar loose upon the shaft within the ring, a band rotatable in the collar, arms connecting the outer ends of the links to the band, and a movable rod arranged in the shaft and having connection with the collar for moving the same.

2. A clutch comprising a driving element, an interiorly grooved ring carried at one side of the driving element, a driven element, a plurality of brackets circularly arranged against one side of the driven element and projecting into the ring, links carried upon the brackets, friction blocks connected to the links and engaging in the groove of the ring, movable arms arranged within the ring and having connection with the outer ends of the links, and operating means attached to the arms.

3. A clutch comprising a driven element, a plurality of downwardly flaring V-brackets arranged circularly and in spaced relation against one side of the driven element, rods connecting the inner ends of the V-brackets, pairs of links each mounted at one end in spaced relation upon the rods, U-shape shoes slidable between the arms of the adjacent brackets, lugs extending in from the shoes and being hinged one between each pair of the links intermediate the ends thereof, friction blocks carried in the shoes, an interiorly grooved ring concentric about the friction blocks, a driving element connected to the ring, radial arms arranged for movement within the ring and having connection with the free ends of the links, and operating means connected to the arms for moving the links.

In testimony whereof I affix my signature in presence of two witnesses.

MARK D. MEEK. [L. S.]

Witnesses:
C. W. DINGER,
RICHARD WESTLUND.

---

Copies of this patent may be obtained for five cents each, by addressing the "Commissioner of Patents, Washington, D. C."